United States Patent
Barjatia et al.

(10) Patent No.: US 10,458,840 B2
(45) Date of Patent: Oct. 29, 2019

(54) LOCATION CLASSIFICATION FOR INTELLIGENT PERSONAL ASSISTANT

(71) Applicant: HARMAN INTERNATIONAL INDUSTRIES, INCORPORATED, Stamford, CT (US)

(72) Inventors: Meenakshi Barjatia, Salt Lake City, UT (US); James M. Kirsch, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 43 days.

(21) Appl. No.: 15/807,137

(22) Filed: Nov. 8, 2017

(65) Prior Publication Data

US 2019/0141449 A1    May 9, 2019

(51) Int. Cl.

| G01H 7/00 | (2006.01) |
| H04S 1/00 | (2006.01) |
| H04S 7/00 | (2006.01) |
| H04R 29/00 | (2006.01) |

(52) U.S. Cl.
CPC ............... *G01H 7/00* (2013.01); *H04S 1/00* (2013.01); *H04S 7/301* (2013.01); *H04R 29/00* (2013.01)

(58) Field of Classification Search
CPC ..... H04R 29/00; G01H 7/00; G10H 2250/531
USPC ........................................................ 700/94
See application file for complete search history.

(56) References Cited

U.S. PATENT DOCUMENTS

| 9,449,613 | B2* | 9/2016 | Peters ................... G10L 25/51 |
| 9,592,382 | B2* | 3/2017 | Kulkarni ............ A61N 1/37247 |
| 9,633,671 | B2* | 4/2017 | Giacobello .......... H04M 9/082 |
| 2009/0147975 | A1 | 6/2009 | Horbach et al. |
| 2013/0202128 | A1 | 8/2013 | Jain et al. |
| 2015/0347638 | A1* | 12/2015 | Patwari .................. G06F 3/165 703/1 |
| 2018/0176696 | A1* | 6/2018 | Voigt Pedersen .... H04R 25/505 |

FOREIGN PATENT DOCUMENTS

EP    2708039 A1    3/2014

* cited by examiner

*Primary Examiner* — Jesse A Elbin
(74) *Attorney, Agent, or Firm* — Brooks Kushman, P.C.

(57) ABSTRACT

A personal assistant device configured to determine a location of the personal assistant device and apply settings specific to the location may include at least one speaker configured to emit a stimulus noise, at least one microphone configured to acquire a room sample based on the stimulus noise, the room sample including a sample room impulse response, and a memory configured to maintain a plurality of room profiles, each room profile including a room location, a stored room impulse response, and a room specific response. A processor may be configured to receive the room sample, compare the sample room impulse response with at least one of the stored room impulse responses, determine whether the sample room impulse response matches one of the stored room impulse responses, apply the room specific response associated with the room profile of the matched stored room impulse response.

19 Claims, 5 Drawing Sheets

LOCATION CLASSIFICATION FOR INTELLIGENT PERSONAL ASSISTANT

TECHNICAL FIELD

Aspects of the disclosure generally relate to a personal assistant for use in performing sequential activities having a plurality of distinct steps.

BACKGROUND

Personal assistant devices and voice agent devices are becoming increasingly popular. These devices may include voice controlled personal assistants that implement artificial intelligence to respond to user audio commands. Some examples of voice agent devices may include Amazon Echo and Echo Dot, Google At Home, etc. Such voice agents may use voice commands as the main interface with processors of the same. The audio commands may be received at one or more microphone within the device. The audio commands may then be transmitted to the processor for implementation of the command.

SUMMARY

A personal assistant device configured to determine a location of the personal assistant device and apply settings specific to the location may include at least one speaker configured to emit a stimulus, at least one microphone configured to acquire a room sample based on the stimulus, the room sample including a sample room impulse response, and a memory configured to maintain a plurality of room profiles, each room profile including a room location, a stored room impulse response, and a room specific response. A processor may be configured to receive the room sample, compare the sample room impulse response with at least one of the stored room impulse responses, determine whether the sample room impulse response matches one of the stored room impulse responses, apply the room specific response associated with the room profile of the matched stored room impulse response.

A personal assistant device configured to determine a location of the personal assistant device and apply settings specific to the location may include at least one speaker configured to emit a stimulus noise, at least one microphone configured to acquire a room sample based on the stimulus noise and including a sample room attribute, and a memory configured to maintain a plurality of room profiles, each room profile including a room location, a stored room attributes, and a room specific response. A processor may be configured to receive the room sample, compare the sample room attribute with at least one of the stored room attributes, determine whether the sample room attribute matches one of the stored room attributes. and apply the room specific response associated with the room profile of the stored room attribute.

A method to determine a location of a personal assistant device and apply settings specific to the location may include receiving a room sample having a sample room impulse response, comparing the sample room impulse response with at least one of a previously stored room impulse responses, determining whether the sample room impulse response matches one of the stored room impulse responses, and applying a room specific response associated with the matched stored room impulse response.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Personal assistant devices may include voice controlled personal assistants that implement artificial intelligence to respond to user audio commands. Some examples of voice agent devices may include Amazon Echo and Echo Dot, Google At Home, etc. Such voice agents may use voice commands as the main interface with processors of the same. The audio commands may be received at a microphone within the device. The audio commands may then be transmitted to the processor for implementation of the command. In some examples, the audio commands may be transmitted externally, to a cloud based processor, such as those used by Amazon Echo and Dot, Google At Home, etc.

Often, these personal assistant devices are portable and may be moved from room to room within a home. The location of the personal assistant device may give valuable context and enable the device to better tailor the information that it provides. For example, a person's music preference may change based on whether the device is located in the bedroom or the home gym. Additionally, commands received by the user may be interpreted differently by the personal assistant device based on the location of the device. Receiving a command "let's do pizza" when the device is on a back patio may be interpreted as "let's order a pizza." On the other hand, receiving the same command while the device is in the kitchen may be interpreted as "lets cook pizza, bring up the recipe." Such location based information and services may provide a better user experience to the user.

Described herein is a system configured to determine the location or room of a personal assistant device based on a room sample acquired at the microphone. The room sample includes attributes and room responses that may be comparable to known room responses. If the room response matches that of a known response, then the device may realize its location based on a room associated with the known response. The device may be classified in the same category with the known response. This relatively seamless, non-cumbersome method, allows for the personal assistant device to be moved throughout a home and for contextual based settings to be applied based on the location. As opposed to methods that determine room location using cameras, the system disclosed herein is less intrusive, allows for more privacy, and is easier to computer due to the smaller data size. Further, by using room response to identify the room, there are no line of sigh constraints.

Figure 1:
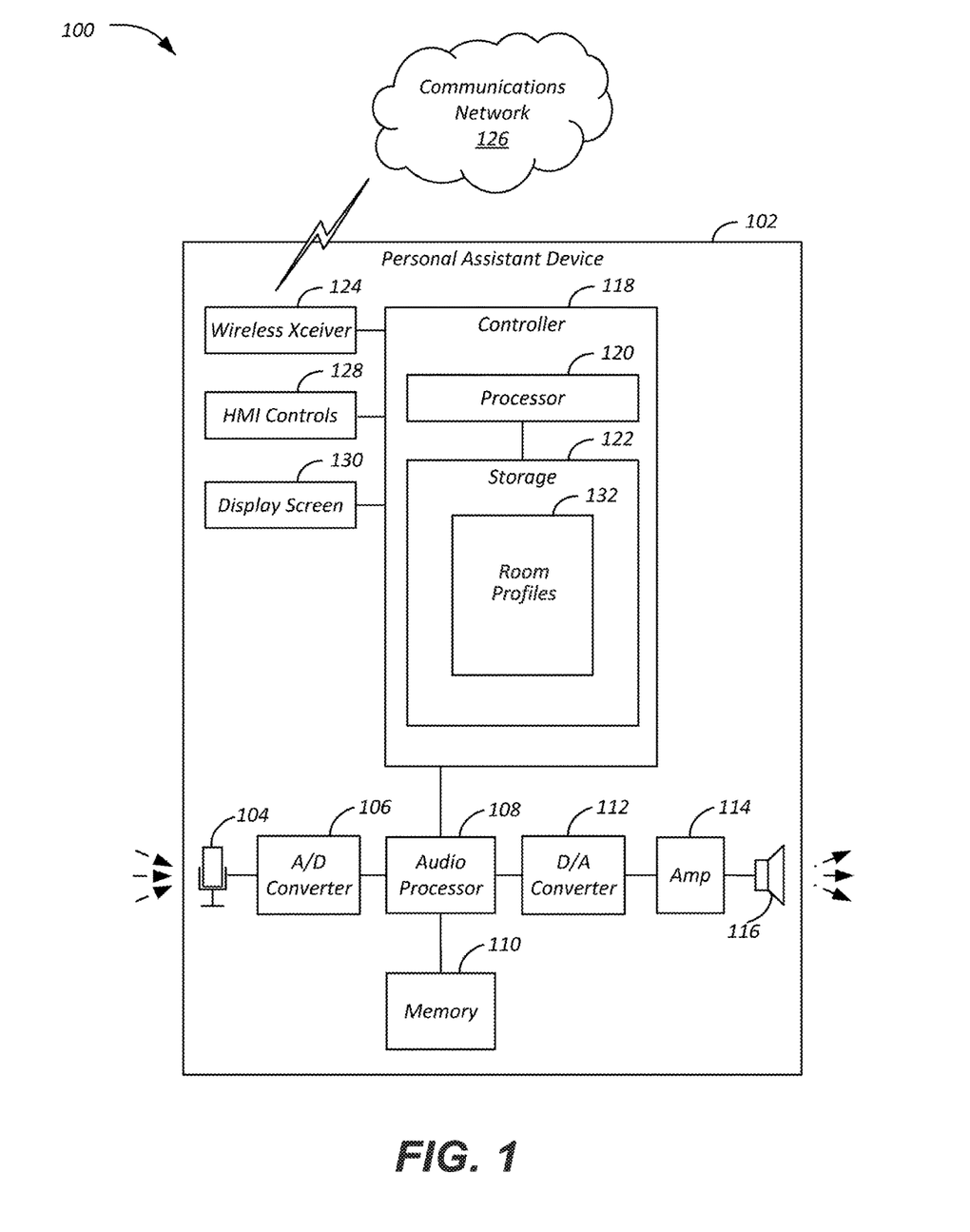
FIG. 1 illustrates a system including an example intelligent personal assistant device, in accordance with one or more embodiments.

FIG. 1 illustrates a system 100 including an example intelligent personal assistant device 102. The personal assistant device 102 receives audio through a microphone 104 or other audio input, and passes the audio through an analog to digital (A/D) converter 106 to be identified or otherwise processed by an audio processor 108. The audio processor 108 also generates speech or other audio output, which may be passed through a digital to analog (D/A) converter 112 and amplifier 114 for reproduction by one or more loudspeakers 116. The personal assistant device 102 also includes a controller 118 connected to the audio processor 108 and configured to manage various room profiles 132.

The controller 118 also interfaces with a wireless transceiver 124 to facilitate communication of the personal assistant device 102 with a communications network 126. In many examples, the controller 118 also is connected to one or more Human Machine Interface (HMI) controls 128 to receive user input, as well as a display screen 130 to provide visual output. It should be noted that the illustrated system 100 is merely an example, and more, fewer, and/or differently located elements may be used.

The A/D converter 106 receives audio input signals from the microphone 104. The A/D converter 106 converts the received signals from an analog format into a digital signal in a digital format for further processing by the audio processor 108.

While only one is shown, one or more audio processors 108 may be included in the personal assistant device 102. The audio processors 108 may be one or more computing devices capable of processing audio and/or video signals, such as a computer processor, microprocessor, a digital signal processor, or any other device, series of devices or other mechanisms capable of performing logical operations. The audio processors 108 may operate in association with a memory 110 to execute instructions stored in the memory 110. The instructions may be in the form of software, firmware, computer code, or some combination thereof, and when executed by the audio processors 108 may provide the audio recognition and audio generation functionality of the personal assistant device 102. The instructions may further provide for audio cleanup (e.g., noise reduction, filtering, etc.) prior to the recognition/classification processing of the received audio. The memory 110 may be any form of one or more data storage devices, such as volatile memory, non-volatile memory, electronic memory, magnetic memory, optical memory, or any other form of data storage device. In addition to instructions, operational parameters and data may also be stored in the memory 110, such as a phonetic vocabulary for the creation of speech from textual data.

The D/A converter 112 receives the digital output signal from the audio processor 108 and converts it from a digital format to an output signal in an analog format. The output signal may then be made available for use by the amplifier 114 or other analog components for further processing.

The amplifier 114 may be any circuit or standalone device that receives audio input signals of relatively small magnitude, and outputs similar audio signals of relatively larger magnitude. Audio input signals may be received by the amplifier 114 and output on one or more connections to the loudspeakers 116. In addition to amplification of the amplitude of the audio signals, the amplifier 114 may also include signal processing capability to shift phase, adjust frequency equalization, adjust delay or perform any other form of manipulation or adjustment of the audio signals in preparation for being provided to the loudspeakers 116. For instance, the loudspeakers 116 can be the primary medium of instruction when the device 102 has no display screen 130 or the user desires interaction that does not involve looking at the device. The signal processing functionality may additionally or alternately occur within the domain of the audio processor 108. Also, the amplifier 114 may include capability to adjust volume, balance and/or fade of the audio signals provided to the loudspeakers 116. The controller 118 may adjust such audio signals provided to the loudspeakers 116 based on the room profile 132.

In an alternative example, the amplifier 114 may be omitted, such as when the loudspeakers 116 are in the form of a set of headphones, or when the audio output channels serve as the inputs to another audio device, such as an audio storage device or a further audio processor device. In still other examples, the loudspeakers 116 may include the amplifier 114, such that the loudspeakers 116 are self-powered.

The loudspeakers 116 may be of various sizes and may operate over various ranges of frequencies. Each of the loudspeakers 116 may include a single transducer, or in other cases multiple transducers. The loudspeakers 116 may also be operated in different frequency ranges such as a sub-woofer, a woofer, a midrange and a tweeter. Multiple loudspeakers 116 may be included in the personal assistant device 102.

The controller 118 may include various types of computing apparatus in support of performance of the functions of the personal assist device 102 described herein. In an example, the controller 118 may include one or more processors 120 configured to execute computer instructions, and a storage medium 122 (or storage 122) on which the computer-executable instructions and/or data may be maintained. A computer-readable storage medium (also referred to as a processor-readable medium or storage 122) includes any non-transitory (e.g., tangible) medium that participates in providing data (e.g., instructions) that may be read by a computer (e.g., by the processor(s) 120). In general, a processor 120 receives instructions and/or data, e.g., from the storage 122, etc., to a memory and executes the instructions using the data, thereby performing one or more processes, including one or more of the processes described herein. Computer-executable instructions may be compiled or interpreted from computer programs created using a variety of programming languages and/or technologies including, without limitation, and either alone or in combination, Java, C, C++, C#, Assembly, Fortran, Pascal, Visual Basic, Python, Java Script, Perl, PL/SQL, etc.

As shown, the controller 118 may include a wireless transceiver 124 or other network hardware configured to facilitate communication between the controller 118 and other networked devices over the communications network 126. As one possibility, the wireless transceiver 124 may be a cellular network transceiver configured to communicate data over a cellular telephone network. As another possibility, the wireless transceiver 124 may be a Wi-Fi transceiver configured to connect to a local-area wireless network to access the communications network 126.

The controller 118 may receive input from human machine interface (HMI) controls 128 to provide for user interaction with personal assistant device 102. For instance, the controller 118 may interface with one or more buttons or other HMI controls 128 configured to invoke functions of the controller 118. The controller 118 may also drive or otherwise communicate with one or more displays 130 configured to provide visual output to users, e.g., by way of a video controller. In some cases, the display 130 (also referred to herein as the display screen 130) may be a touch screen further configured to receive user touch input via the video controller, while in other cases the display 130 may be a display only, without touch input capabilities.

The room profiles 132 include a plurality of locations at which the virtual assistant may be located. For example, the room profiles 132 may include a profile for each of a room of a house, including a kitchen, bedroom, office, home gym, outdoor space, living room, etc. Each room may be associated with certain audio settings applied to the audio signal when the device 102 is located at that location. That is, the audio settings may be specific to each location. For example, the starting music genre and volume associated with an outdoor space may be louder than that associated with the home office. Other audio processing attributes such as equalization, filtering, etc., may be specific to each location and defined within the room profile for that location.

The device 102 may ship with various default room responses such as a mock kitchen or living room. When the user initiates the device 102 in his or her home, the device 102 may roughly classify a room as a bedroom, kitchen, living room, etc. The device 102 may operate in a training mode and slowly learn more about the room from the room responses, audio commands received. Additionally or alternatively, the user may classify the room by saying "this is my living room."

Each room may be identified by a room sample collected from the microphone 104 of the personal assistant device. The room sample may be collected upon start-up of the device 102. A stimulus noise may be emitted from the loudspeaker 116 and the room sample may be subsequently recorded. The room sample may include approximately 20 seconds of recorded audio signal and may be transmitted to the processor 120. The room sample may be a logarithmic frequency sweep from 20 Hz to 20 kHz, a broadband random noise stimulus, and/or synthesized music.

In one example, the room sample may include unique room impulse responses (RIR). These impulse responses may be unique to each room and therefore be used to identify the room as the device is moved between various locations. The RIRs may include an amplitude envelope (i.e., amplitude over time). A RIR of a room may vary slightly depending on the exact location of the device 102 within the room. However, a RIR of two different rooms may vary dramatically. Because of this, the RIR acquired by the room sample may be used to classify or identify a room or location of the device 102. For example, a sample RIR of a room sample may be compared to stored RIRs. If a certain number of amplitudes of the sample response aligned or match with that of a stored response associated with a known room, then the room may be identified based on the stored response. This is discussed in more detail herein.

In other examples, the room sample may include explicit identification of the room where a user states which room the device 102 is located in, e.g., "in kitchen." In another example, the room sample may be analyzed to determine a room size, as well as to identify ambient noise typically associated with a room such as running water, typing in an office, snoring in a bedroom, or a refrigerator running.

Figure 2:
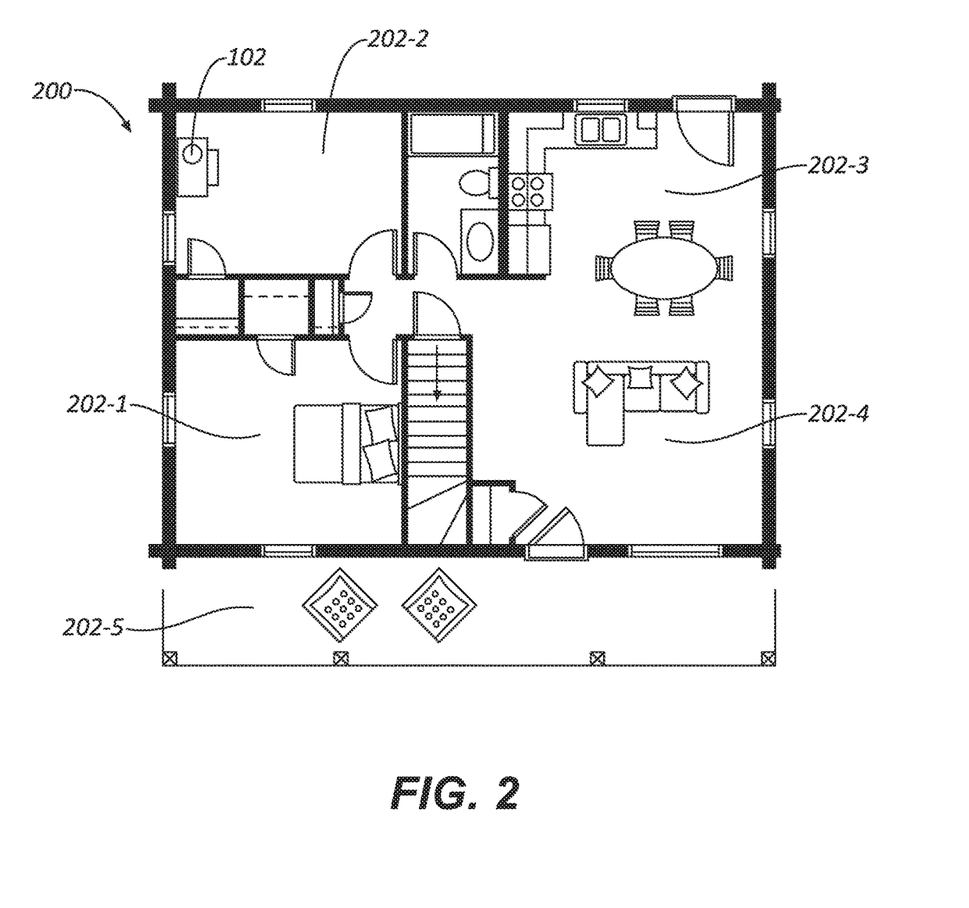
FIG. 2 illustrates an example home including a plurality of rooms.

Also, it is possible to have an augmented dataset/input sample multiple microphones with multiple speakers can form multiple mic-speaker pairs of RIRs. Each of these RIRs can be fed into an ensemble classification system at the processor 120, where each classifier gets a vote about which room 202 the device 102 is in. The final decision is usually a weighted result of these individual votes. Alternately, the input sample space dimension can be increased from N to N*M where N is the number of points in a single RIR (i.e., the dimensionality of a single RIR) and M is the number of mic-speaker pairs. The classifier then works on this N*M-D input space. This is possible because these devices 102 often have multiple microphones and speakers (tweeter, subwoofer, stereo channels).

FIG. 2 illustrates an example home 200 including a plurality of rooms 202. The rooms 202 may include, for example, a bedroom 202-1, a home office 202-2, a kitchen 202-3, a living room 202-4, and an outdoor space or patio 202-5. Various other rooms and locations may be appreciated and included. For example, a home gym, basement, etc., may also be included in the home 200.

The personal assistant device 102 may be moved from room to room throughout the home 200. In the example shown in FIG. 2, the device 102 is located within the home office 202-2. As explained above, each room 202 may be associated with a room profile 132. Each room 202 may have a unique RIR. The RIR may be affected by the room's layout, size, number of windows, height of the ceiling, various background noises typically present in that particular room, etc. The processor 120 may derive the RIR by analyzing a room sample acquired by the microphone 104.

Figure 3:
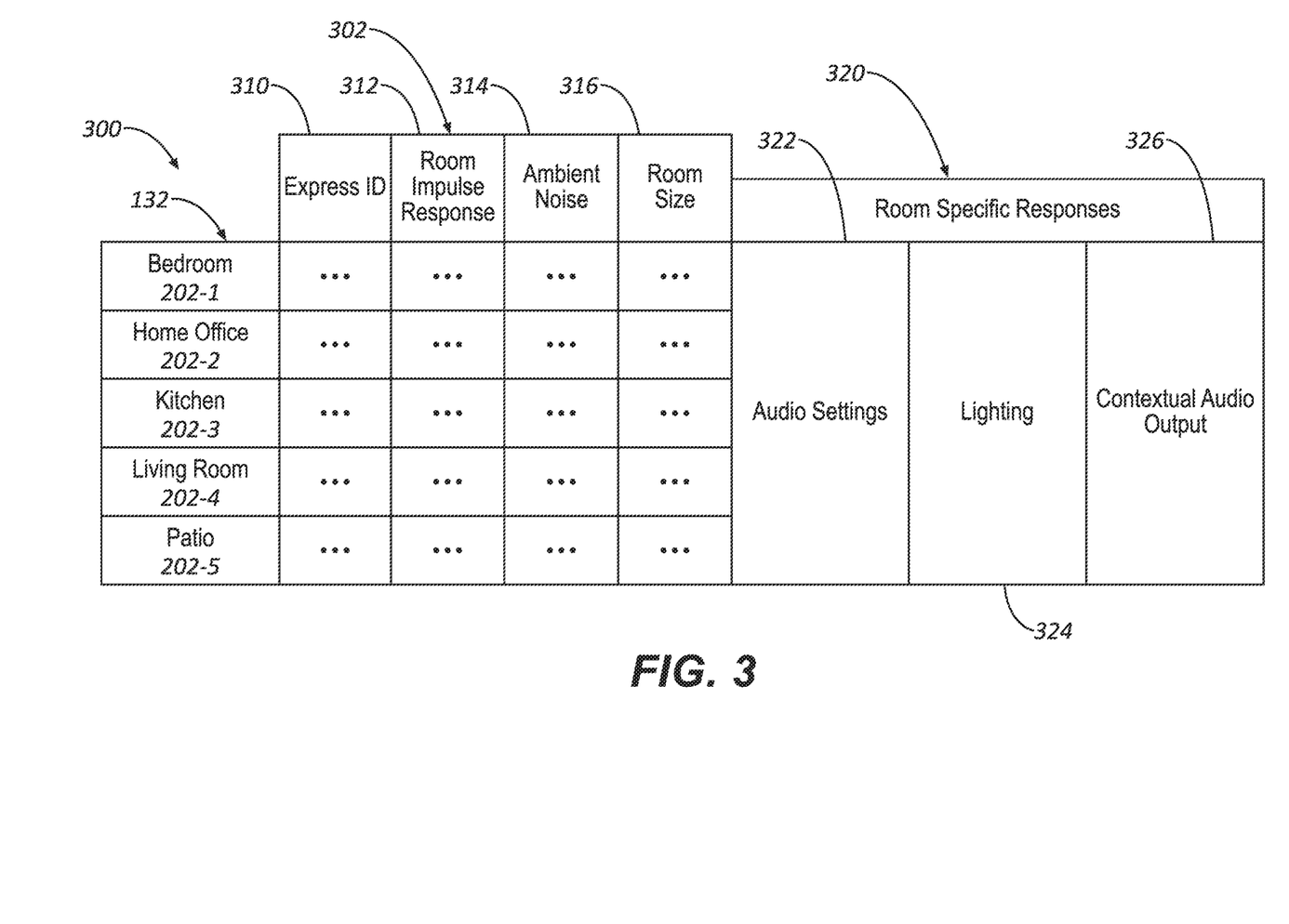
FIG. 3 illustrates an example chart of room profiles.

FIG. 3 illustrates an example chart 300 of room profiles 132. Each room 202 may have on or more classification mechanisms 302 (or attributes 302) associated therewith. For example, one classification mechanism 302 may include a stored RIR specific 312 to that room. The classification mechanisms 302 may also include stored ambient noise 314, stored room size 316, and stored express identification 310 of the room by the user. Each of these classification mechanisms 302 may be used to identify the current location of the device 102.

Upon initiation or power-on of the personal assistant device, the loudspeaker 116 may emit the stimulus noise. The stimulus noise may be a short and high frequency chirp, or other ping. The microphone 104 may subsequently capture the audio response (i.e., capture the room sample). The room sample may include ambient noise over a certain amount of time. For example, the room sample may record ambient noise for 20 seconds after initiation or start up. The ambient noise may be used by the processor 120 to classify the room. The processor 120 may classify the room based on one or more of the classification mechanisms 302. For example, the processor 120 may match the RIR of the room sample with a similar one of one of the room profiles 132. By aligning the RIR, the processor 120 may determine that the device 102 is most likely in that room and subsequently apply a room specific response 320. The ambient noise may be collected continuously or periodically.

The room specific response 320 may include various responses that could have different context depending on the location of the device 102, such as audio settings 322, lighting responses 324, and contextual audio output responses 326. The audio settings 322 may include music variables such as preferred genres of music, starting volume, etc. The audio settings 322 may also include noise reduction and compression settings specific to the room. As explained above, one genre of music may be preferred and typically played in the home office 202-2, while another genre may be preferred in the kitchen 202-3.

Specific lighting responses 324 may also be associated with each room 202. Users may instruct the lights in a room to turn off, turn on, dim, etc. Upon receiving such instructions, the personal assistant device 102 may transmit instructions to the various lights to perform the received commands. These lighting responses may be limited to adjusting the lights within room in which the personal assistant 102 device is located. For example, while the personal assistant device 102 is determined to be in the home office 202-2, any lighting commands received from the user may be attributed to the lights in the home office 202-2 only.

The personal assistant device 102 may receive other commands from the user and provide contextual audio output responses 326 based on the specific room. For example, the user may say "let's do pizza." Room specific responses to this example command may vary depending on which room 202 the personal assistant device 102 is located. In the kitchen, for example, the personal assistant device 102 may interpret this command to mean that the user wishes to make pizza. The device 102 may in turn respond by dictating a recipe for pizza. On the other hand, if the device 102 is located on the patio 202-5, the device 102 may provide a response allowing the user to order a pizza. For example, the device 102 may emit the phone number for a local pizza delivery restaurant.

Figure 4:
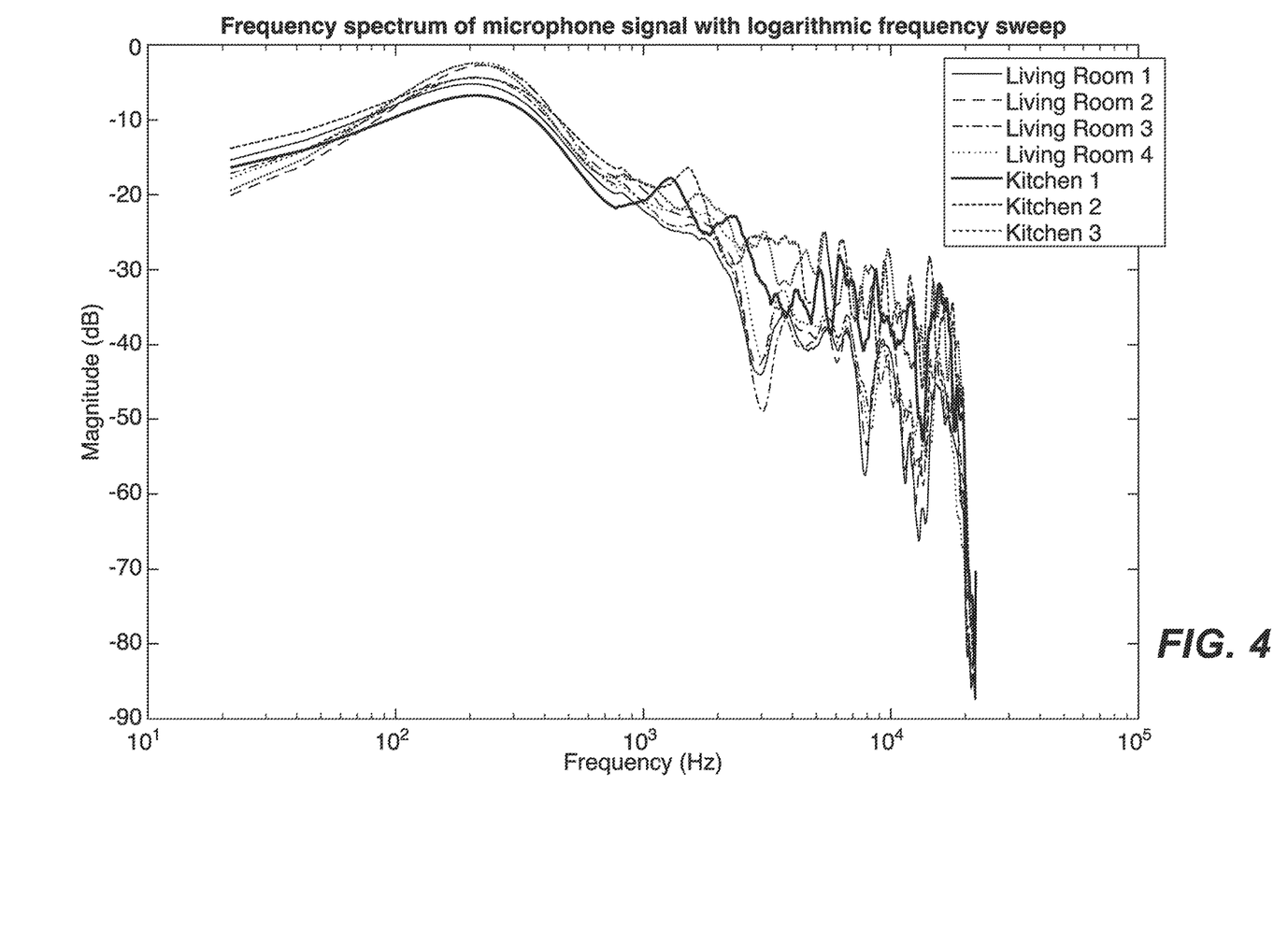
FIG. 4 illustrates an example chart of example RIRs.

FIG. 4 illustrates an example chart 400 of example RIRs for various rooms 202. The RIRs, as evident by the chart, vary from room to room, each room having a unique response at various amplitudes. The measurements may be taken at slightly different locations, each within a two-foot diameter circle. For example, kitchen measurements 1, 2, and 3 are all within two feet of each other. Based on the room sample acquired by the microphone, the processor 120 may identify a room based on the received room sample. For example, the amplitudes of the sample RIR of the room sample may be compared to the amplitudes of the stored RIRs. If a certain number of amplitudes of the sample response aligned or match with that of a stored response associated with a known room, then the room may be identified based on the stored response. In one example, if more amplitudes of the sample response and the stored response match than do not match (i.e., a majority of the amplitudes match), then the processor 120 may determine that the responses are similar and therefor may classify the room as that assigned with the stored response based on the room profile 132. In another example, the predefined number of samples that are required to match the impulse responses may be a finite number, such as 10. In yet another example, the room may be classified based on the stored response that has the most amplitude matches with the sample response.

Further, a simple k-nearest neighbor classification algorithm using the amplitudes at different frequencies of raw measured RIR may be used. In this example, the Euclidean distance between the newly measurement RIR and its nearest neighbor may be used to determine which room label the RIR corresponds to. Further, the processor 120 may only use the frequencies that seem relevant for classification, i.e., the frequencies that vary between rooms but do not significantly vary within the rooms. The processor 120 may exclude higher frequencies above 1 kHz as the response in this region may vary with miniscule changes.

In addition to aligning the amplitudes of various stored RIRs, the processor 120 may also implement clustering algorithms such as K-means clustering, as well as advanced machine learning algorithms like Support Vector Machines (SVMs), neural networks, etc. in order to classify the location of the device 102.

Notably, the RIRs may vary around the room depending on the placement of the device 102. For example, the device 102 could be placed near a wall, as well as in the center of the room 202. The RIR matching algorithms may be location insensitive to associate the RIR with a stored response. The use of additional mechanisms such as room size 316 and ambient noise 314 may aid to classify the RIR. The processor 120 may learn to look for the same label for different location within the same room. The processor 120 may use (Deep Neural Networks) DNN's, room size 316 may be less important since the DNN is expected to learn the room size. Multiple stored responses may be associated with a single room and therefore each be capable of capturing the differing locations for that room.

The room size 316 may be determined by the discrete echoes in the room that correspond to the walls around the room and are associated with the size of the room. After the room size 316 is accounted for, the duration of the reverberant tail can give an indication of the smoothness and acoustic reflectivity of the space (e.g., a room cluttered with furniture will have shorter reverberant tail than if there was no furniture in it. Similarly, a room made of hardwood will have longer tail than a room whose floor and walls are padded with carpets and curtains.)

Figure 5:
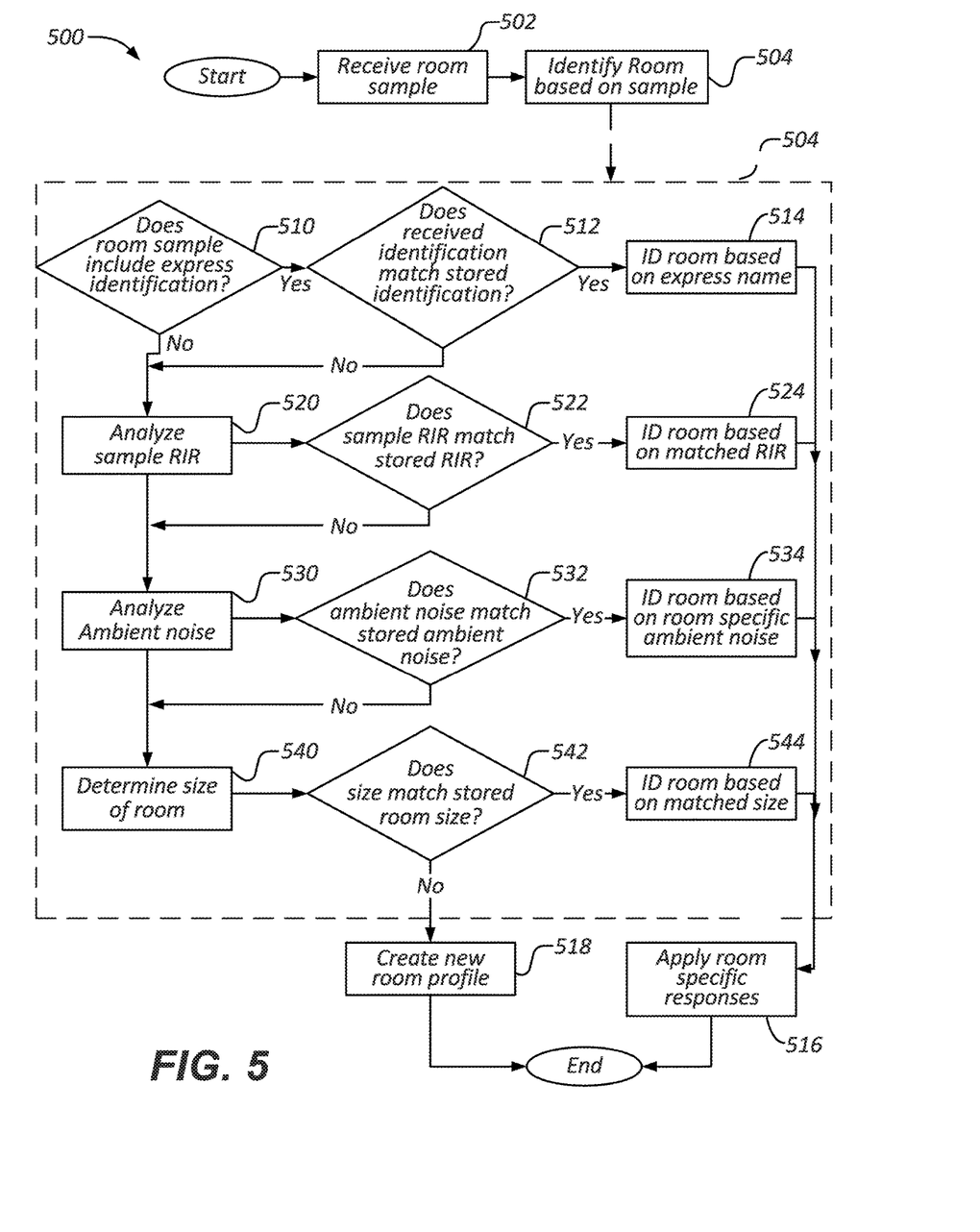
FIG. 5 illustrates an example process for the personal assistant device to classify or identify using a classification mechanism and room profiles.

FIG. 5 illustrates an example process 500 for the personal assistant device 102 to classify or identify using a classification mechanism 302 and room profiles 132.

The process 500 begins at block 502. At block 502, the processor 120 receives the room sample from the microphone 104. As explained above, the room sample may be an audio signal captured by the microphone 104 upon power-on of the device 102. The microphone 104 may capture the room sample for a predetermined amount of time. In one example, the predetermined amount of time may be approximately three seconds. The processor 120 may receive the room sample form the microphone 104.

At block 504, the processor 120 may identify the room based on the received room sample. Several attributes or classification mechanisms 302, as explained above with respect to FIG. 3, may be used to identify the room. These attributes 302 are described in more detail below with respect to blocks 510, 520, 530, and 540. Generally, the processor 120 may compare the sample attributes received via the room sample form the microphone with stored attributes 302. Upon matching the sample attributes with one of the stored attributes, the processor 120 may then apply the room profile 132 and associated room specific responses 320 associated with the matched attributes.

Within block 504, the processor 120, at block 510, may determine whether the room sample includes an express identification of the room. The express identification may include a spoken name of a room by the user. For example, upon start up, the user may say "in the kitchen," or "office." The processor 120 may recognize this express identification by the user as a typical name of a room or location within a home. If the processor 120 recognizes an express identification, the process 500 proceeds to block 512. If not, the process 500 proceeds to block 520.

At block 512, the processor 120 may determine whether the express identification matches one of the stored identifications within the room profiles 132 within the chart 300. For example, the processor 120 may recognize and identify the room profile for the kitchen 202-3 upon recognizing the command "kitchen". On the other hand, if the express identification includes a phrase or name such as "basement," the processor 120 may not recognize the room profile since this express identification does not match one of the stored identifications. If the processor 120 recognizes or matches the express identification with that of a room within the room profiles 132, the process 500 proceeds to block 514. If not, the process 500 proceeds to block 520.

At block 514, the processor 120, in response to matching the express identification with that of a stored identification of one of the room profiles 132, may identify or classify the room based on this room profile.

At block 516, the processor 120 may apply the room specific responses 320 associated with the matched room profile 132. Thus, in the example above, the room responses 320 associated with the kitchen may be applied to provide contextual, room-specific information and responses.

At block 520, the processor 120 may analyze the RIR of the room sample. This may include determining certain amplitudes of the logarithmic sweep of the room sample.

At block, 522, the processor 120 may determine whether the RIR of the room sample matches a stored RIR of the room profiles 132. As explained above, this may be based on the amplitudes of the sample RIR and the stored RIR. If the sample RIR matches that of one of the stored RIRs, the process 500 proceeds to block 524. If not, the process 500 proceeds to block 530.

At block 524, the processor 120, in response to matching the RIR with a stored RIR of the room profiles 132, may identify the room based on the room profile of the stored RIR.

At block 530, the processor 120 may analyze the room sample for ambient noises. As explained, certain ambient noises may be identified, such as a refrigerator running, water running, etc. If processor 120 determines that the room sample includes recognizable ambient noises, the process 500 proceeds to block 532. If not, the process proceeds to block 540.

At block 532, the processor 120 may determine whether any of the room profiles includes or are associated with such ambient noises. For example, the processor 120 may determine that the room sample includes a noise similar to that of a refrigerator running. Thus, the ambient noise may be associated with the kitchen 202-3. If the processor 120 matches an identified ambient noise with one of a room profile 132, the process 500 proceeds to block 534. If not, the process 500 proceeds to block 540.

At block 534, the processor 120, in response to matching the ambient noise with a stored ambient noise, may identify the room based on the room profile 132 of the matched ambient noise.

At block 540, the processor 120 may determine a size of the room based on the room sample. As explained above, the size of the room can be inferred from the timing of the initial reflections. The earlier the reflections are, the smaller the room.

At block 542, the processor 120 may determine whether the room size matches a stored room size. If so, the process 500 proceeds to block 544. If not, the process proceeds to block 518.

At block 544, the processor 120, in response to matching the room size with a stored room size, may identify the room based on the room profile 132 of the matched room size.

At block 518, the processor 120, in response to failing to identify the room based on the room sample, may create a new room profile based on the room sample. That is, a new room 202 may be created and the room responses 320 may be those acquired by the room sample.

In referring to the block 504, and the mechanisms 302 of blocks 510, 520, 530, and 540, one or more of these mechanisms 302 may be used to determine the location of the device 102. While the process 500 illustrates that one mechanism is used after another mechanism could not be used to identify the room (e.g., see blocks 512, 522 and 524), two or more mechanisms 302 may be used concurrently or nearly concurrently to verify room identification and increase accuracy. Using more than one mechanism 302 allows the processor 120 to increase certainty in the classification.

In another example and similar to the example shown in FIG. 5, a hierarchy of mechanisms 302 may be defined and maintained in the storage. For example, the processor 120 may first look to an express identification to identify a room. Next, the processor 120 may look to the RIR, then to the ambient noise, and then to the room size.

The processor 120 may also form a deductive analysis. That is, by process of elimination, the processor 120 may estimate or deduct which room the device 102 is in. For example, if the ambient noise received via the room sample does not include a refrigerator running, then the kitchen may be ruled out, etc. While the room sample is described above as being acquired before the classification of a room, room samples may be acquired continuously or periodically. The ambient noise may change with time. For example, a refrigerator may not run continuously, and therefore may the sounds of the refrigerator running may not be included in the initial room sample. However, after a few minutes, the refrigerator may run, and therefore a subsequent room sample may identify this ambient noise for classification purposes.

Accordingly, room specific and highly targeted responses may be given by a virtual assistant device. By analyzing a room sample, the device may determine a likely location or room and adjust its responses, including audible answers to commands, audio settings, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A personal assistant device configured to determine a location of the personal assistant device and apply settings specific to the location, comprising:
   at least one speaker configured to emit a stimulus noise;
   at least one microphone configured to acquire a room sample based on the stimulus noise, the room sample including a sample room impulse response;
   a memory configured to maintain a plurality of room profiles, each room profile including a room location, a stored room impulse response, and a room specific response;
   a processor configured to:
      receive the room sample;
      compare the sample room impulse response with at least one of the stored room impulse responses;
      determine whether the sample room impulse response matches one of the stored room impulse responses; and
      apply the room specific response associated with the room profile of the matched stored room impulse response.

2. The device of claim 1, wherein the room sample includes a logarithmic frequency sweep of a predetermined amount of time.

3. The device of claim 1, wherein the sample room impulse response includes a plurality of amplitudes over time.

4. The device of claim 3, wherein the processor is further configured to determine that the sample room impulse response (RIR) matches one of the stored room impulse responses in response to a predefined amount of the amplitudes of the sample response matching amplitudes of the stored response.

5. The device of claim 3, wherein the processor is further configured determine that the sample room impulse response matches one of the stored room impulse responses in response to a majority of the amplitudes of the sample response matching amplitudes of the stored response.

6. The device of claim 1, wherein the room specific response includes contextual audible output responses at the microphone based on the room profile of the matched stored room impulse response.

7. The device of claim 1, wherein the room specific response includes audio settings specific to the room profile of the matched stored room impulse response.

8. A personal assistant device configured to determine a location of the personal assistant device and apply settings specific to the location, comprising:
    at least one speaker configured to emit a stimulus noise;
    at least one microphone configured to acquire a room sample based on the stimulus noise and including a sample room attribute;
    a memory configured to maintain a plurality of room profiles, each room profile including a room location, a stored room attributes, and a room specific response;
    a processor configured to:
        receive the room sample;
        compare the sample room attribute with at least one of the stored room attributes;
        determine whether the sample room attribute matches one of the stored room attributes; and
        apply the room specific response associated with the room profile of the stored room attribute.

9. The device of claim 8, wherein the room sample includes a logarithmic frequency sweep of a predetermined amount of time.

10. The device of claim 8, wherein the sample room attribute includes a sample room impulse response.

11. The device of claim 10, wherein the sample room impulse response includes a plurality of amplitudes over time.

12. The device of claim 11, wherein the processor is further configured determine that the sample attribute matches one of the stored attributes in response to a predefined amount of the amplitudes of the sample response matching amplitudes of the stored attribute.

13. The device of claim 11, wherein the processor is further configured determine that the sample attribute matches one of the stored attributes in response to a majority of the amplitudes of the sample response matching amplitudes of the stored attribute.

14. The device of claim 8, wherein the room specific response includes contextual audible output responses at the microphone based on the room profile of the matched stored attribute.

15. The device of claim 8, wherein the room specific response includes audio settings specific to the room profile of the matched stored attribute.

16. A method to determine a location of a personal assistant device and apply settings specific to the location, comprising:
    receiving a room sample having a sample room impulse response;
    comparing the sample room impulse response with at least one of a previously stored room impulse responses;
    determining whether the sample room impulse response matches one of the stored room impulse responses; and
    applying a room specific response associated with the matched stored room impulse response, wherein the room specific response includes contextual audible output responses at a microphone based on the matched stored room impulse response.

17. The method of claim 16, wherein the sample room impulse response includes a plurality of amplitudes over time.

18. The method of claim 17, further comprising determining whether the sample room impulse response matches one of the stored room impulse responses includes determining whether a predefined amount of the amplitudes of the sample response match amplitudes of the stored response.

19. The method of claim 17, further comprising determining whether the sample room impulse response matches one of the stored room impulse responses includes determining whether a majority of the amplitudes of the sample response matching amplitudes of the stored response.

* * * * *